United States Patent
Wu

(10) Patent No.: US 11,720,404 B2
(45) Date of Patent: Aug. 8, 2023

(54) SYSTEMS AND METHODS FOR ARBITRATING ACCESS TO A SHARED RESOURCE

(71) Applicant: Samsung Electronics Co., Ltd., Suwon-si (KR)

(72) Inventor: Chun-Chu Chen-Jhy Archie Wu, San Carlos, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 266 days.

(21) Appl. No.: 17/076,681

(22) Filed: Oct. 21, 2020

(65) Prior Publication Data

US 2022/0019471 A1 Jan. 20, 2022

Related U.S. Application Data

(60) Provisional application No. 63/052,899, filed on Jul. 16, 2020.

(51) Int. Cl.
*G06F 15/16* (2006.01)
*G06F 9/50* (2006.01)

(52) U.S. Cl.
CPC ................. *G06F 9/5027* (2013.01)

(58) Field of Classification Search
CPC .... G06F 9/5027; G06F 9/52; G06F 2209/548; G06F 9/546; G06F 13/1663; G06F 13/1642; G06F 13/18; G06F 13/1631; G06F 2213/0064
See application file for complete search history.

(56) References Cited

U.S. PATENT DOCUMENTS

| 6,675,251 B1* | 1/2004 | Streitenberger .... G06F 13/4059 710/306 |
| 7,899,927 B1* | 3/2011 | Basu ...................... H04L 47/10 710/240 |
| 7,916,956 B1 | 3/2011 | Hobbs et al. |

(Continued)

FOREIGN PATENT DOCUMENTS

| WO | WO-2006039615 A1 * | 4/2006 | ............. H04L 47/10 |
| WO | WO-2019125560 A1 * | 6/2019 | ......... G06F 13/1636 |

*Primary Examiner* — Ario Etienne
*Assistant Examiner* — Thorne E Waugh
(74) *Attorney, Agent, or Firm* — Lewis Roca Rothgerber Christie LLP

(57) ABSTRACT

Systems and methods for arbitrating access of a shared resource are disclosed. Data is received from various sources and stored in various queues. A first data structure is generated based on the stored data. The first data structure may be associated with two dimensions (e.g. a first dimension associated with sources and a second dimension associated with destinations). A second data structure is generated based on the first data structure. The second data structure may be associated with one dimension. The one dimension may include the second dimension. A first arbitration is performed based on the second data structure for selecting a destination. A second arbitration is performed based on the first data structure and the selected destination for selecting a source. Data stored in one of the queues associated with the selected source and the selected destination is retrieved, and the retrieved data is provided to the shared resource.

17 Claims, 8 Drawing Sheets

(56) References Cited

U.S. PATENT DOCUMENTS

| | | | |
|---|---|---|---|
| 7,995,580 B2* | 8/2011 | Patel | H04L 49/1538 370/392 |
| 10,540,584 B2* | 1/2020 | McBride | G06F 13/28 |
| 10,944,694 B2* | 3/2021 | Tietz | H04L 49/254 |
| 11,520,626 B2* | 12/2022 | Campbell | G06F 9/4881 |
| 2002/0141427 A1* | 10/2002 | McAlpine | H04L 49/50 370/413 |
| 2006/0179197 A1* | 8/2006 | Chung | G06F 12/0831 710/242 |
| 2006/0187958 A1* | 8/2006 | Clark | H04L 49/109 370/468 |
| 2008/0320235 A1 | 12/2008 | Beckmann et al. | |
| 2014/0075125 A1 | 3/2014 | Biswas et al. | |
| 2015/0019731 A1* | 1/2015 | Abts | G06F 13/1642 709/226 |
| 2015/0058571 A1 | 2/2015 | Potter et al. | |
| 2015/0324300 A1 | 11/2015 | Sampathkumar et al. | |
| 2017/0075838 A1* | 3/2017 | Nooney | H04L 49/1515 |
| 2019/0114281 A1 | 4/2019 | Li et al. | |
| 2020/0057715 A1 | 2/2020 | Benisty et al. | |

* cited by examiner

SYSTEMS AND METHODS FOR ARBITRATING ACCESS TO A SHARED RESOURCE

CROSS-REFERENCE TO RELATED APPLICATION(S)

The present application claims priority to and the benefit of U.S. Provisional Application No. 63/052,899, filed Jul. 16, 2020, entitled "REVERSE ORDER ARBITRATION USING HINT BASE PROPAGATION IN MULTIPLE LEVEL ARBITRATION," the entire content of which is incorporated herein by reference.

FIELD

One or more aspects of embodiments according to the present disclosure relate to accessing a shared resource, and more particularly to a scalable arbitration system and method that mediates access to the shared resource.

BACKGROUND

There are various situations where one or more sources of data may want to access one or more destinations over a shared resource. The one or more sources may be, for example, software applications of a computing system, and the destinations may be storage locations of a data storage device. The access to the storage device may be over a shared data communications link, such as, for example, a Peripheral Component Interconnect Express (PCIe) link. Although multiple software applications may want to access the data storage device at a given time, the shared data communications link limit the access to one application at a time.

Accordingly, it is desirable to have a mechanism for mediating/arbitrating access of the shared resource in an efficient and scalable manner.

SUMMARY

An embodiment of the present disclosure is directed to a method for arbitrating access of a shared resource. Data is received from a plurality of sources and stored in a plurality of queues. A first data structure is generated based on the data stored in the plurality of queues. The first data structure is associated with at least two dimensions, wherein the at least two dimensions include a first dimension associated with the plurality of sources and a second dimension associated with a plurality of destinations. A second data structure is generated based on the first data structure. The second data structure is associated with at least one dimension, where the at least one dimension includes the second dimension. A first arbitration is performed based on the second data structure, where the first arbitration is for selecting a destination from the plurality of destinations. A second arbitration is performed based on the first data structure and the selected destination, where the second arbitration is for selecting a source from the plurality of sources. Data stored in one of the plurality of queues associated with the selected source and the selected destination is retrieved, and the retrieved data is provided to the shared resource.

According to one embodiment, a particular queue of the plurality of queues is associated with a particular source of the plurality of sources, and a particular destination of the plurality of destinations, wherein the particular queue stores data from the particular source addressed to the particular destination.

According to one embodiment, the first data structure includes a plurality of first bits, wherein a first bit of the plurality of first bits is associated with the particular source and the particular destination, wherein the first bit is set based on the data being stored in the particular queue.

According to one embodiment, the second data structure includes a plurality of second bits, wherein a second bit of the plurality of second bits is associated with the particular destination, and wherein the generating of the second data structure includes performing a logical OR operation based on a subset of bits of the first data structure having the particular destination as the second dimension.

According to one embodiment, the method further includes dynamically allocating logic for performing the second arbitration based on the selected destination.

According to one embodiment, the shared resource is a data transmissions link.

An embodiment of the present disclosure is also directed to a method for arbitrating access of a shared resource, where the method includes receiving data from a plurality of sources; storing the data in a plurality of queues; generating a first data structure based on the data stored in the plurality of queues, the first data structure being associated with at least three dimensions, wherein the at least three dimensions include a first dimension associated with the plurality of sources, a second dimension associated with a plurality of attributes, and a third dimension associated with a plurality of destinations; generating a second data structure based on the first data structure, the second data structure being associated with at least two dimensions, wherein the at least two dimensions include the second dimension associated with the plurality of attributes, and the third dimension associated with the plurality of destinations; generating a third data structure based on the second data structure, the third data structure being associated with at least one dimension, wherein the at least one dimension includes the third dimension; performing a first arbitration based on the third data structure, the first arbitration for selecting a destination from the plurality of destinations; performing a second arbitration based on the second data structure and the selected destination, the second arbitration for selecting an attribute from the plurality of attributes; performing a third arbitration based on the first data structure, the selected attribute, and the selected destination, the third arbitration for selecting a source from the plurality of sources; retrieving data stored in one of the plurality of queues associated with the selected source, the selected attribute, and the selected destination; and providing the retrieved data to the shared resource.

According to one embodiment, a particular queue of the plurality of queues is associated with a particular source of the plurality of sources, a particular attribute of the plurality of attributes, and a particular destination of the plurality of destinations, wherein the particular queue stores data having the particular attribute, the particular source, and the particular destination.

According to one embodiment, the particular attribute is a priority level of a plurality of priority levels.

According to one embodiment, the first data structure includes a plurality of first bits, wherein a first bit of the plurality of first bits is associated with the particular source, the particular attribute, and the particular destination, wherein the first bit is set based on the data being stored in the particular queue.

According to one embodiment, the second data structure includes a plurality of second bits, wherein a second bit of the plurality of second bits is associated with the particular attribute and the particular destination, wherein the generating of the second data structure includes performing a logical OR operation based on subset of bits of the first data structure having the particular attribute and the particular destination as respectively the second dimension and the third dimension.

According to one embodiment, the third data structure includes a plurality of third bits, wherein a third bit of the plurality of third bits is associated with the particular destination, wherein the generating of the third data structure includes performing a logical OR operation based on a subset of bits of the second data structure having the particular destination as the third dimension.

According to one embodiment, the method further includes dynamically allocating logic for performing the second arbitration based on the selected destination; and dynamically allocating logic for performing the third arbitration based on the selected attribute and the selected destination.

An embodiment of the present disclosure is further directed to a system for arbitrating access of a shared resource. The system includes a memory for storing a plurality of queues, the plurality of queues storing data from a plurality of sources; and a processing circuit coupled to the memory. The processing circuit may have logic for: generating a first data structure based on the data stored in the plurality of queues, the first data structure being associated with at least a two-dimensional parameter identifying one or more sources and one or more destinations for the data; generating a first data structure based on the data stored in the plurality of queues, the first data structure being associated with at least two dimensions, wherein the at least two dimensions include a first dimension associated with the plurality of sources and a second dimension associated with a plurality of destinations; generating a second data structure based on the first data structure, the second data structure being associated with at least one dimension, wherein the at least one dimension includes the second dimension; performing a first arbitration based on the second data structure, the first arbitration for selecting a destination from the plurality of destinations; performing a second arbitration based on the first data structure and the selected destination, the second arbitration for selecting a source from the plurality of sources; retrieving data stored in one of the plurality of queues associated with the selected source and the selected destination; and providing the retrieved data to the shared resource.

As a person of skill in the art should recognize, embodiments of the present disclosure provide an efficient and scalable mechanism for mediating/arbitrating access to the shared resource. The arbitration mechanism of the various embodiments allows for a plurality levels of arbitration that removes the need for multiple arbiters at a particular level of arbitration. The arbitration mechanism of the various embodiments further removes the need to copy data into intermediate queues while performing the arbitration. The reduced number of arbiters and the elimination intermediate queues help provide savings in terms of hardware resources, cost, die area requirements, and/or power usage. Performance may also be improved in terms of latency and throughput, given that embodiments of the present disclosure avoid copying data to intermediate queues. In addition, by removing the copying of data into the intermediate queues, any security measures that may be needed for the intermediate copying may also be removed. Thus, embodiments of the present disclosure help provide improvements in both cost-area-power and performance.

These and other features, aspects and advantages of the embodiments of the present disclosure will be more fully understood when considered with respect to the following detailed description, appended claims, and accompanying drawings. Of course, the actual scope of the invention is defined by the appended claims.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

DETAILED DESCRIPTION

Figure 1:
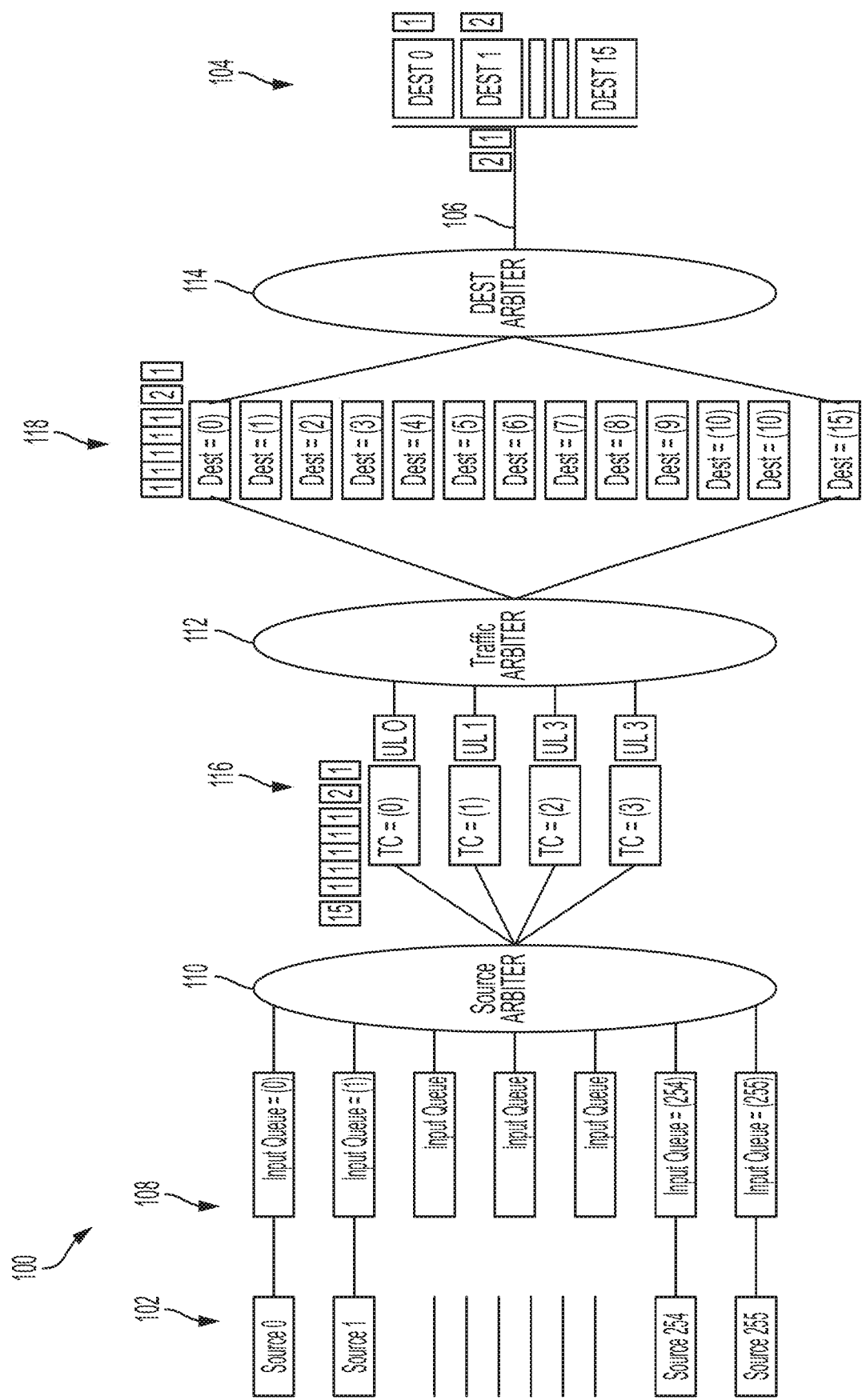
FIG. 1 is a conceptual layout diagram of an existing multi-level arbitration system.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, in the drawings, the relative sizes of elements, layers, and regions may be exaggerated and/or simplified for clarity.

In general terms, embodiments of the present disclosure are directed to a system and method for providing arbitration of a shared resource (e.g., a shared serial link). Such an arbitration may be desirable when multiple sources seek access to a finite number of destinations over the shared resource. For example, 256 input sources may seek to transmit data to 16 destinations using a shared link.

An existing multi-level arbitration mechanism provides arbitration among different input sources in a first level of arbitration, among different traffic classes in a second level of arbitration, and among different output destination in a third level of arbitration. The existing multi-level arbitration mechanism may further use a different queue structure in each level of arbitration.

FIG. 1 is a conceptual layout diagram of an existing multi-level arbitration system 100. The system may include multiple sources 102 seeking to transmit data to multiple destinations 104 over a shared resource 106. The arbitration system may provide an input queue 108 for each supported data source 102, and the data source may store data to be transmitted to a destination, in the input queue 108 corresponding to the data source.

The arbitration system may also include a source arbiter 110, traffic arbiter 112, and destination arbiter 114, for performing forward arbitration based on respectively source, traffic class, and destination parameters. The source arbiter 110 may perform a first level of arbitration to select an input queue (source) of the various input queues 108, that is to access the shared resource. The data in the selected input queue 108 may be copied to one of various traffic queues 116 according to a traffic class (e.g. priority) to which the data belongs. The arbitration system may provide a traffic queue 116 for each supported traffic class.

The traffic arbiter 112 may perform a second level of arbitration of the different traffic classes, and select a particular traffic class queue of the various traffic queues 116, based on a selection algorithm. The data in the selected traffic class queue 116 may be copied to one of various destination queues 118 according to destination information of the data in the selected traffic queue. The arbitration system may provide a destination queue 118 for each supported destination 104.

The destination arbiter 114 may perform a third level of arbitration of the different destination queues 118, and select a particular destination queue of the various destination queues, based on a selection algorithm. Data (e.g. a first data packet) stored in the selected destination queue may be provided to the shared resource 106 for service. In this regard, the shared resource may transmit the selected data to the destination associated with the selected destination queue.

One problem that may arise in the multi-level arbitration system of FIG. 1 is referred to as head-of-line (HOL) blocking. For a computing system, HOL blocking may occur when a line of data packets in a queue is blocked by a first packet in line. The first packet may block other packets in the queue from being processed if the second packet cannot be processed due to, for example, congestion at the destination of the first packet. The other packets, third packet and later, may be blocked by second packet even if they are addressed to a destination that does not suffer from congestion.

Figure 2:
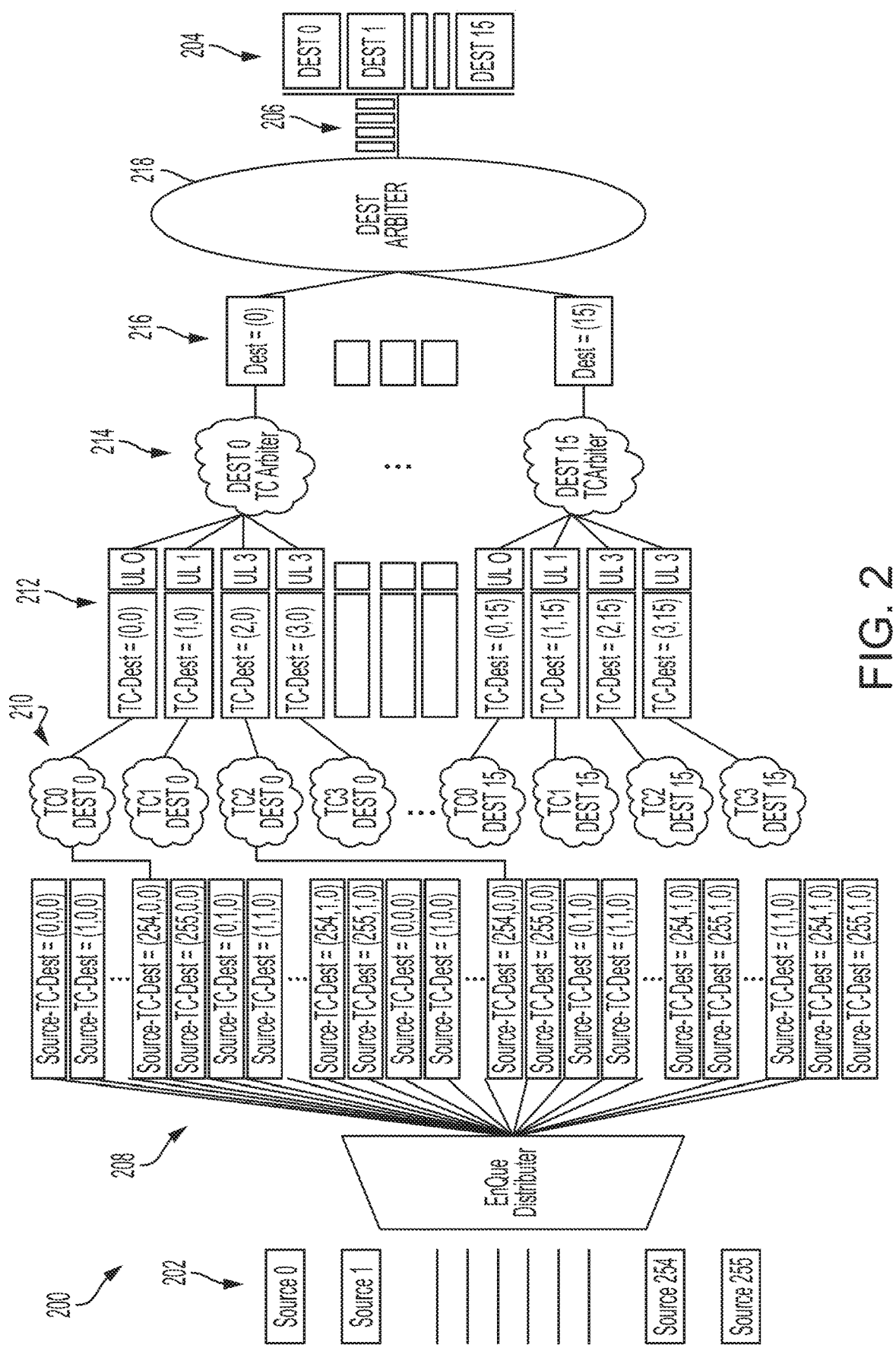
FIG. 2 is a conceptual layout diagram of another existing multi-level arbitration system for addressing head of line blocking.

FIG. 2 is a conceptual layout diagram of an existing multi-level arbitration system 200 for addressing HOL blocking. As in FIG. 1, the system 200 includes multiple sources 202 seeking to transmit data to multiple destinations over a shared resource 206. The data transmitted by the multiple sources 202 may be stored in multiple input queues 208. The arbitration system 200 of FIG. 2 may address the HOL blocking issue by providing input queues 208 along three-dimensions. In this regard, an input queue 208 may be provided for each combination of input source, traffic class, and destination. For example, assuming that the arbitration system 200 includes 256 sources 202, four traffic classes, and 16 destinations, the total number of input queues 208 provided by the arbitration system is 16,384.

The arbitration system 200 may provide a first set of arbiters 210 to concurrently perform a first level of arbitration. An arbiter in the first set 210 may be provided for each combination of traffic class and destination. The arbiter 210 associated with a particular traffic class and destination may be configured to arbitrate among input queues 208 that are associated with the particular traffic class and destination. An input queue 208 may then be selected for the arbitrated traffic class and destination, based on a selection algorithm. In the example where the arbitration system 200 includes four traffic classes and 16 destinations, the total number of first set of arbiters may be 64.

The data in the input queues 208 selected as a winner of the first level arbitration by each arbiter 210 may be copied into corresponding traffic queues 212. A second set of arbiters 214 may then concurrently perform a second level of arbitration based on the data stored in the traffic queues 212. An arbiter in the second set 214 may be configured to arbitrate among traffic queues that are associated with a particular destination, and select a traffic queue for the arbitrated destination, based on a selection algorithm. The arbitration system 200 may provide an arbiter 214 for each destination supported by the arbitration system 200. In the event that sixteen destinations are supported, the arbitration system may provide sixteen arbiters 214 to perform the second level of arbitration.

The data in the traffic queues 212 selected as a winner of the second level arbitration by each arbiter 214 may be copied into corresponding destination queues 216. A destination arbiter 218 may perform a third level of arbitration of the different destination queues 216, and select a particular destination queue based on a selection algorithm. Data (e.g. a first data packet) stored in the selected destination queue 216 may be provided to the shared resource 206 for service. In this regard, the shared resource may transmit the selected data to the destination associated with the selected destination queue.

Although the arbitration system 200 of FIG. 2 may address the HOL blocking issue, the solution may be costly in terms of resources, die area, and processing power that may be needed to implement the solution. Accordingly, there is a need for an arbitration system that may be more efficient in terms of the resources, die area, and/or processing power.

Figure 3:
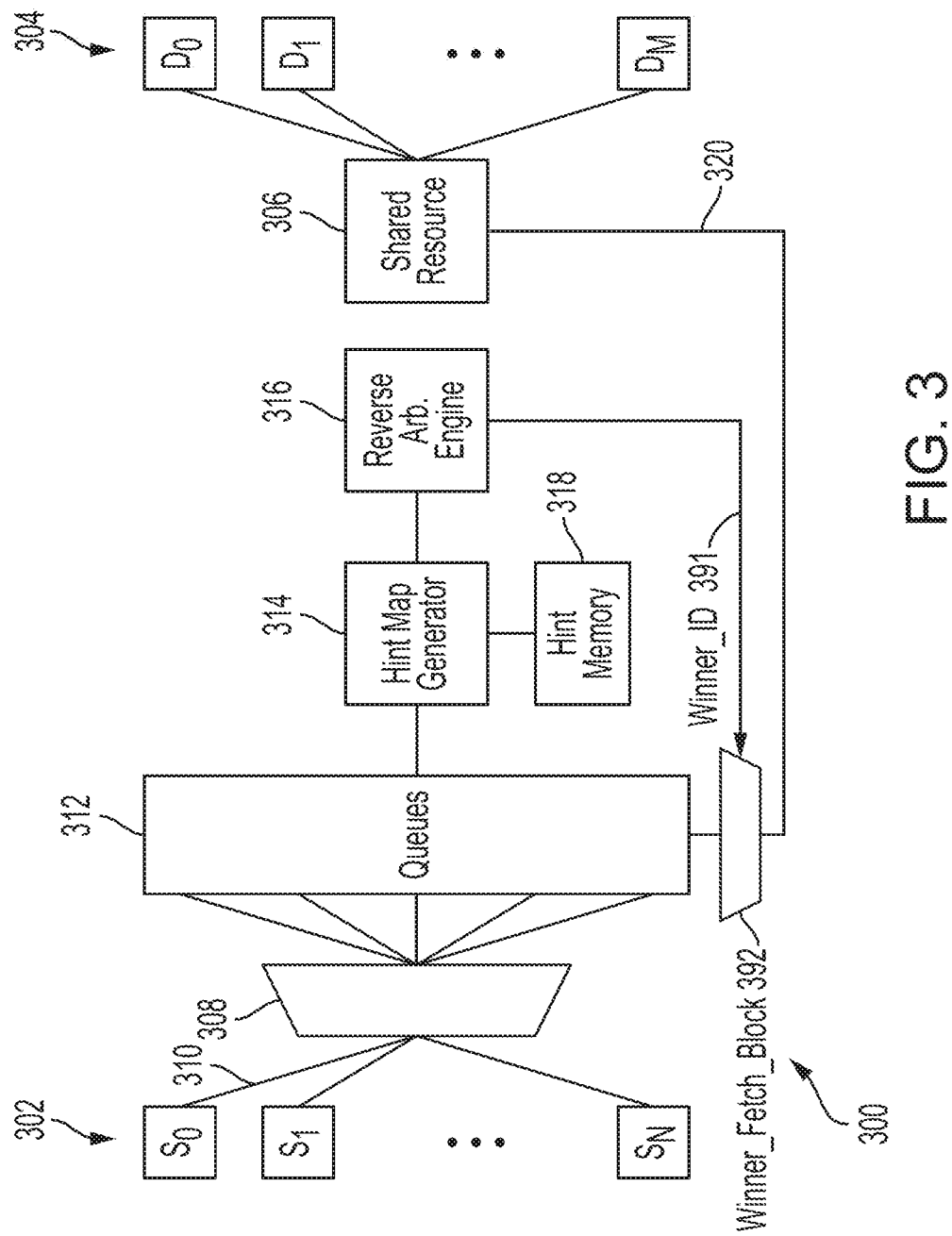
FIG. 3 is a block diagram of an arbitration system according to an embodiment of the present disclosure.

FIG. 3 is a block diagram of an arbitration system 300 according to an embodiment of the present disclosure. The system may include multiple sources 302 seeking to transmit data to multiple destinations 304 over a shared resource 306. For example, N number of sources (e.g. 0-255 sources) may seek to transmit data to M number of destinations (e.g. 0-15 destinations). The sources 302, destinations 304, and the shared resource 306 may be physical or virtual components of a computer system. For example, the sources may be different software applications, and the destinations may be storage locations of a storage device (e.g. a solid state drive). The access to the storage device may be over a shared data communications link, such as, for example, a PCIe link or Open NAND Flash Interface (ONFI) link.

The sources 302, destinations 304, and the shared resource 306 may also be locations/components of a physical world. For example, the sources 302 may be different post office locations that transmit mail to different geographic locations (destinations 304) using a shared airline carrier. When such physical world components are involved, the sources, destinations, and the shared resource may be simulated by a computer system to arbitrate access to the shared resource.

In one embodiment, the arbitration system 300 includes a distributor 308 that is coupled to the multiple sources 302 over a data communications link 310. The data communications link 310 may be any data communications link conventional in the art, that allows independent transmittal of the data to the distributor 308. The distributor 308 may receive data from the multiple sources 302, and transmit the data to the plurality of queues 312 for storing. The queues 312 may be, for example, a static random access memory (SRAM) of a storage device.

In one embodiment, a queue of the plurality of queues 312 is associated with at least two-dimensional (2D) parameters. In one embodiment, the queue is associated with at least three-dimensional (3D) parameters. The parameter may identify, for example, a source of the plurality of sources 302, and a destination of the plurality of destinations 304. In some embodiments, the parameter may further identify an attribute of the data, such as, for example, a traffic class (TC). A traffic class may identify a priority level of the data. For example, TC 0 may identify an urgent priority level, TC 1 may identify a high priority level, TC 2 may identify a middle priority level, and TC 3 may identify a low priority level. Each queue of the plurality of queues 312 may be associated with a corresponding combination of parameters (2D, 3D, or 3D plus).

The arbitration system 300 may provide a queue 312 for each combination of parameters used for identifying the queues 312. For example, where a 2D parameter is used, the arbitration system 300 may provide a queue for each combination of source 302 and destination 304. Where a 3D parameter is used, the arbitration system 300 may provide a queue for each combination of source 302, attribute, and destination 304. The distributor 308 may store the data in one or more appropriate queues based on the parameters associated with the data.

In one embodiment, the arbitration system 300 further includes a hint map generator 314 and a reverse arbitration engine 316. The hint map generator 314 and reverse arbitration engine 316 may be implemented via hardware, firmware, or software, or a combination of hardware, firmware, and/or software. For example, in an embodiment where the arbitration system 300 arbitrates access to storage locations of a storage device, the hint map generator 314 and reverse arbitration engine 316 may be part of a controller subsystem of the storage device.

In one embodiment, the hint map generator 314 is configured to generate a data structure (referred to as a hint map) for performing an arbitration based on a parameter associated with the data in the queues 312. The arbitration system 300 may be configured to provide one or more levels of arbitration. A particular parameter of the data may be considered at a particular level of arbitration, to select a winning value of the arbitrated parameter.

In one embodiment, the hint map generator 314 is configured to generate a separate hint map for each level of arbitration. The hint map may include a plurality of bits, where a bit of the plurality of bits is associated with one or more parameters. The number of parameters associated with a bit of the hint map may depend on the level of arbitration for which the hint map is generated. For example, assuming two levels of arbitration, the hint map used in the first level of arbitration may be associated with two parameters (e.g. source and destination), and the hint map used in the second level of arbitration may be associated with one parameter (e.g. destination). In another example, assuming three levels of arbitration, the hint map used in the first level of arbitration may be associated with three parameters (e.g. source, traffic class, and destination), the hint map used in the second level of arbitration may be associated with two parameters (e.g. traffic class and destination), and the hint map used in the third level of arbitration may be associated with one parameter (e.g. destination).

The generated hint maps may be stored in a hint storage 318. In one embodiment, the hint maps are stored until all levels of arbitration have been completed for a current processing cycle. The hint storage 318 may be implemented, for example, via SRAM.

In one embodiment, a generated hint map is propagated from one arbitration level to another, and may indicate an arbitration request at the propagated arbitration level. In one embodiment, the hint maps are propagated by performing a logical OR operation of a subset of the bits in the hit map associated with a prior level. For example, a second level hint map associated with a particular dimension (e.g. particular destination and traffic class) may be generated by performing a logical OR of the bits in the first level hint map associated with a different dimension (e.g. a source). In another example, a third level hint map associated with a particular destination may be generated by performing a logical OR of the hint bits in the second level hint map associated with the particular destination.

The reverse arbitration engine 316 may be configured to perform one or more levels of arbitration based on a parameter associated with the data in the queues 312. In one embodiment, the one or more levels of arbitration is based on the hint maps generated by the hint map generator 314. The use of hint maps to perform the different levels of arbitration eliminates the need to copy data into separate queues associated with the different arbitration levels, such as queues 212, 216, described with reference to the arbitration system 200 of FIG. 2.

In one embodiment, the reverse arbitration engine 316 performs reverse arbitration starting from a final/highest arbitration level (e.g. arbitration closest to the destination 304), to an initial/lowest arbitration level (e.g. arbitration closest to the source 302). At a given arbitration level, a hint map that has been generated for the arbitration level is used for selecting a winning value of a parameter that is subject of the arbitration. The winning value may then be used to dynamically allocate an arbiter for next lower arbitration level. The allocated arbiter may then perform an arbitration based on the hint map generated for the lower arbitration level. The reverse arbitration process may continue until a first level of arbitration identifies a winning queue of the plurality of queues 302. In this regard, a winning ID 391 of the winning queue selected by the reverse arbitration engine 316 is sent to a queue fetching block 392. In one embodiment, the queue fetching block 392 is configured to fetch data stored in the winning queue identified by the winning ID 391. In one embodiment, a head-of-line entry of the winning queue is fetched and forwarded to the shared resource 306 via a data communications link 320.

Figure 4:
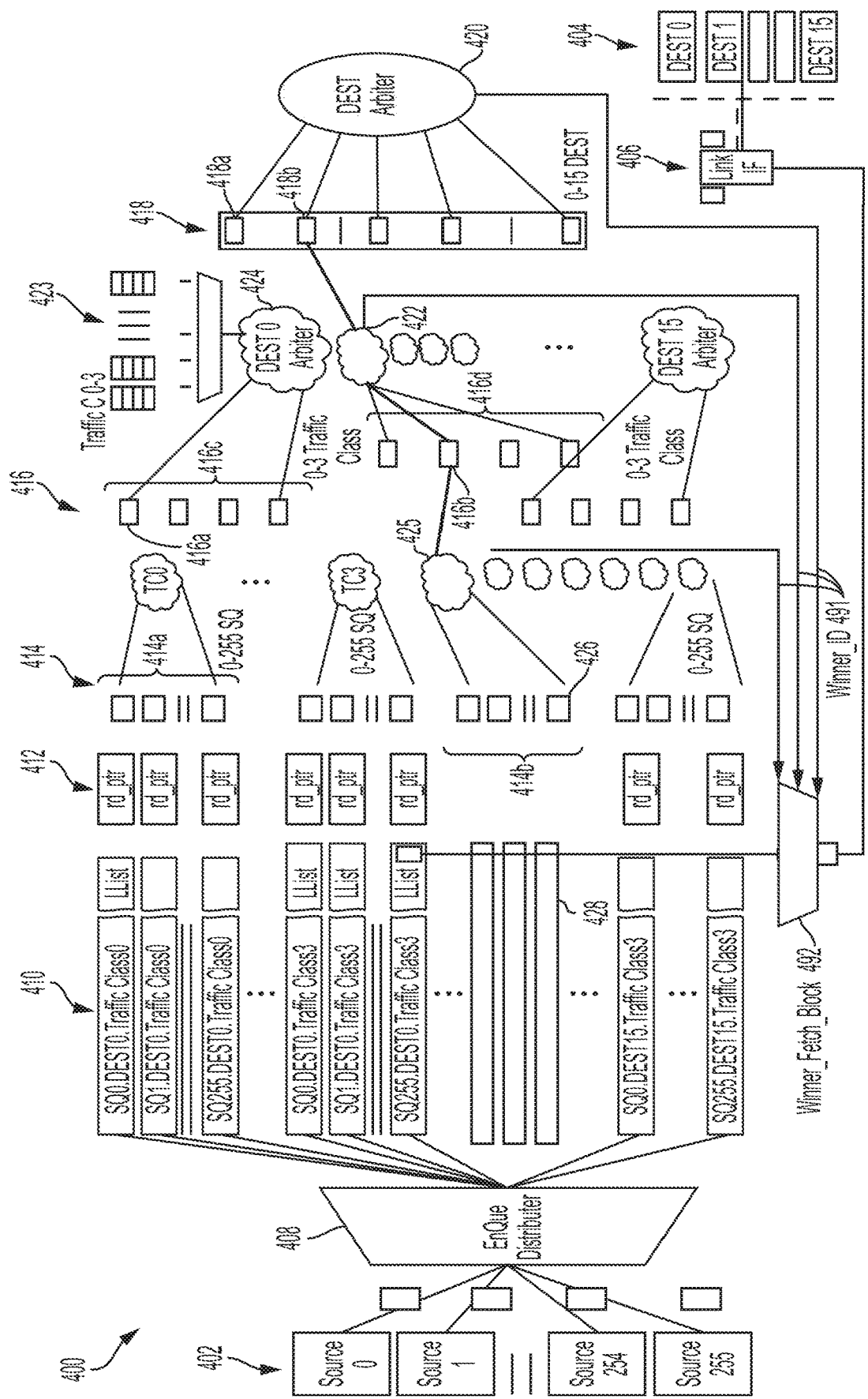
FIG. 4 is a conceptual layout diagram of various components of a three-level arbitration system according to one embodiment.

FIG. 4 is a conceptual layout diagram of various components of a three-level arbitration system 400 according to one embodiment. The various components of the three-level arbitration system 400 may be similar to the components of the arbitration system 300 of FIG. 3. It should be appreciated that although FIG. 4 depicts three levels of arbitration, the arbitration system 400 may be modified to support fewer or higher levels of arbitration.

The arbitration system 400 includes a plurality of sources 402 (e.g. 0-255 sources) and a plurality of destinations 404 (e.g. 0-16 destinations). One or more of the plurality of sources 402 may seek to transmit data (e.g. data packets) to one or more of the plurality of destinations 404 over a shared resource 406. The shared resource 406 may be, for example, a PCIe link or OFNI link.

The data transmitted by the one or more sources 402 is provided to a distributor 408 for enqueueing the data in one or more of a plurality of queues 410. In this regard, the distributor 408 may select a queue based on parameters associated with the data. In one embodiment, three parameters may be used for identifying the data, and the associated queue. The three parameters may identify a source, attribute (e.g. traffic class), and destination. A separate queue may be provided for each possible combination of the values of the three parameters, for storing data associated with the values. For example, if there are 256 possible sources, four possible traffic classes, and sixteen possible destinations, the total number of possible queues 410 is 16,384 (256×4×16).

A read pointer 412 may be used to retrieve a next data packet in a corresponding queue 410 that is selected to access the shared resource 406.

In one embodiment, the hint map generator 314 is invoked for generating a hint map for each level of arbitration. In a three-level arbitration system, the hint map generator 314 may generate a first level hint map 414, second level hint map 416, and a third level hint map 418. The first level hint map 414 may identify one or more of the queues 410 that have queued data. Each bit of the first level hint map 414 may be associated with a three-dimensional parameter identifying a particular queue associated with a particular source, particular traffic class, and particular destination. A bit in the hint map 414 may be set in response to determining that the corresponding queue is not empty (has queued data). For example, one or more bits of a subset of bits 414a of the first level hint map may be set for one or more of the sources 402 that are associated with destination "0" and traffic class "0".

The second level hint map 416 may identify one or more of the attributes (e.g. traffic classes) and destinations associated with the queued data that is represented by the first level hint map 414. In this regard, each bit of the second level hint map 416 may be associated with a two-dimensional parameter identifying a particular traffic class, and a particular destination. A bit in the second level hint map 416 may be set in response to determining that there is at least one queue for a particular traffic class and a particular destination, that has queued data. In this regard, the bits in the first level hint map 414 that are associated with the particular traffic class and the particular destination are identified, and a logical OR operation is performed for the identified bits. In one embodiment, the result of the logical OR operation is used to set a value of the bit in the second level hint map 416, that corresponds to the particular traffic class and the particular destination. For example, a bit 416a corresponding to traffic class "0" and destination "0" may be set in the second level hint map 416, in response to at least one of the bits in the corresponding subset of bits 414a of the first level hint map being set. Similarly, a bit 416b corresponding to traffic class "1" and destination "1" may be set in response to at least one of the bits in a corresponding subset of bits 414b of the first level hint map being set.

The third level hint map 418 may identify one or more of the destinations associated with the queued data that is represented by the second level hint map 416. In this regard, each bit of the third level hint map 418 may be associated with a one-dimensional parameter identifying a particular destination. A bit in the third level hint map 418 may be set in response to determining that there is at least one queue associated with the particular destination, that has queued data. In this regard, the bits in the second level hint map 416 that are associated with the particular destination are identified, and a logical OR operation is performed for the identified bits. In one embodiment, the result of the logical OR operation is used to set a value of the bit in the third level hint map 418, that corresponds to the particular destination. For example, a bit 418a corresponding to destination "0" may be set in the third level hint map 418, in response to at least one of the bits in the corresponding portion 416c of the second level hint map being set. Similarly, a bit 418b corresponding to destination "1" may be set in response to at least one of the bits in a corresponding subset of bits 416d of the second level hint map being set.

In one embodiment, the generated hint maps are used for performing an arbitration at each arbitration level. In this regard, a generated hint map may be used as a request to arbitrate at a corresponding arbitration level. The arbitration may start at a final level closest to the destination 404 (e.g. level three), and proceed backwards to the lower arbitration levels (e.g. level two and then level one). In one embodiment, a level three arbiter 420 (e.g. destination arbiter) is allocated by the reverse arbitration engine 316 to perform the level three arbitration. The level three arbiter 420 may use the third level hint map 418 of destinations, to select one of the set bits as a winning destination of the level three arbitration. The winning destination may be selected based on a scheduling algorithm. The scheduling algorithm may be any scheduling algorithm conventional in the art, such as, for example, round robin, weighted round robin, fixed priority, or the like. The winning destination may be, for example, the destination identified by bit 418b, corresponding to destination "1."

In one embodiment, the reverse arbitration engine 316 uses the winning destination of the level three arbitration to dynamically allocate an arbiter 422 for the second arbitration level. For example, in response to the winning destination of the level three arbitration being destination "1," a destination "1" arbiter may be dynamically allocated to perform the level two arbitration. Other destination arbiters associated with non-selected destinations (e.g. destination "0" arbiter 424) need not be allocated. Thus, it should be appreciated that the reverse arbitration of the various embodiments allows a reduction of arbiters when compared to existing forward arbitration systems, such as the system 200 of FIG. 2. For example, when the number of destinations is 16, the forward arbitration system 200 of FIG. 2 may invoke 16 arbiters, while an embodiment of the present disclosure invokes a single arbiter 422.

The level two arbiter 422 may identify a parameter of the second level hint map 416 for which the level two arbitration is to be conducted. For example, if the level two arbiter 422 is a destination "1" arbiter, the level two arbitration may be among different traffic classes that are associated with destination "1." In this regard, the level two arbiter 422 may select one of the set bits in the second level hint map that includes destination "1" as a first parameter, and a winning traffic class as a second parameter. For example, bit 416b of the second level hint map corresponding to traffic class "1" for various destination "1" bits may be selected as the winner of the level two arbitration.

A scheduling algorithm may be used to select the winning traffic class for the level two arbitration. The scheduling algorithm may be the same or different than the scheduling algorithm of the level three arbitration. In one embodiment, the scheduling algorithm for selecting a winning traffic class is based on historical usage data/statistics 423 of the shared resource 426 by the particular traffic class. For example, the scheduling algorithm may select a lower traffic class that has low historical usage as the winner of the level two arbitration, over a higher traffic class that has a higher historical usage.

In one embodiment, the reverse arbitration engine 316 uses the winner of the level two arbitration to dynamically allocate an arbiter 424 for the first arbitration level. For example, in response to the winner of the level two arbitration being traffic class "1" for various destination "1" bits, a source arbiter 424 associated with traffic class "1" and destination "1" may be dynamically allocated to perform the level one arbitration. Other arbiters for other combinations of traffic classes and destinations need not be allocated. In an embodiment where the number of traffic classes is four, and the number of destinations is 16, the source arbiters may be reduced from 64 to 1.

The level one arbiter 424 may identify a parameter of the first level hint map 414 for which the level one arbitration is to be conducted. For example, if the level one arbiter 424 is a traffic class "1" arbiter for destination "1," the level one arbitration may be of different sources that are associated with traffic class "1" and destination "1." In this regard, the level one arbiter 424 may select one of the set bits in the first level hint map that includes traffic class "1" and destination "1" as first and second parameters, and a winning source as a third parameter. For example, bit 426 of the first level hint map corresponding to source "255" for various traffic class "1" and destination "1" bits may be selected as the winner of the level one arbitration.

A scheduling algorithm may be used to select the winning source for the level one arbitration. The scheduling algorithm may be the same or different than the scheduling algorithms of the level two or level three arbitrations. In one embodiment, the parameters of a winning bit 426 of the first level hint map 414 in conjunction with the winning bit of the second level hint map 416 and the winning bit of the third level hint map 418 may be used for indexing a winning queue 428 of the plurality of queues 410. For example, the parameters may identify a winning ID 491 of the winning queue. The winning ID 491 may be sent to a queue fetching block 492 for fetching data in the winning queue. The head-of-line entry identified by the corresponding read pointer 412 in the winning queue may be dequeued and forwarded to the shared resource 406 for processing. In one embodiment, usage data/statistics 423 of the traffic class associated with the winning bit 426 may be updated based on a predicted amount of time for servicing the data by the shared resource 406.

Figure 5:
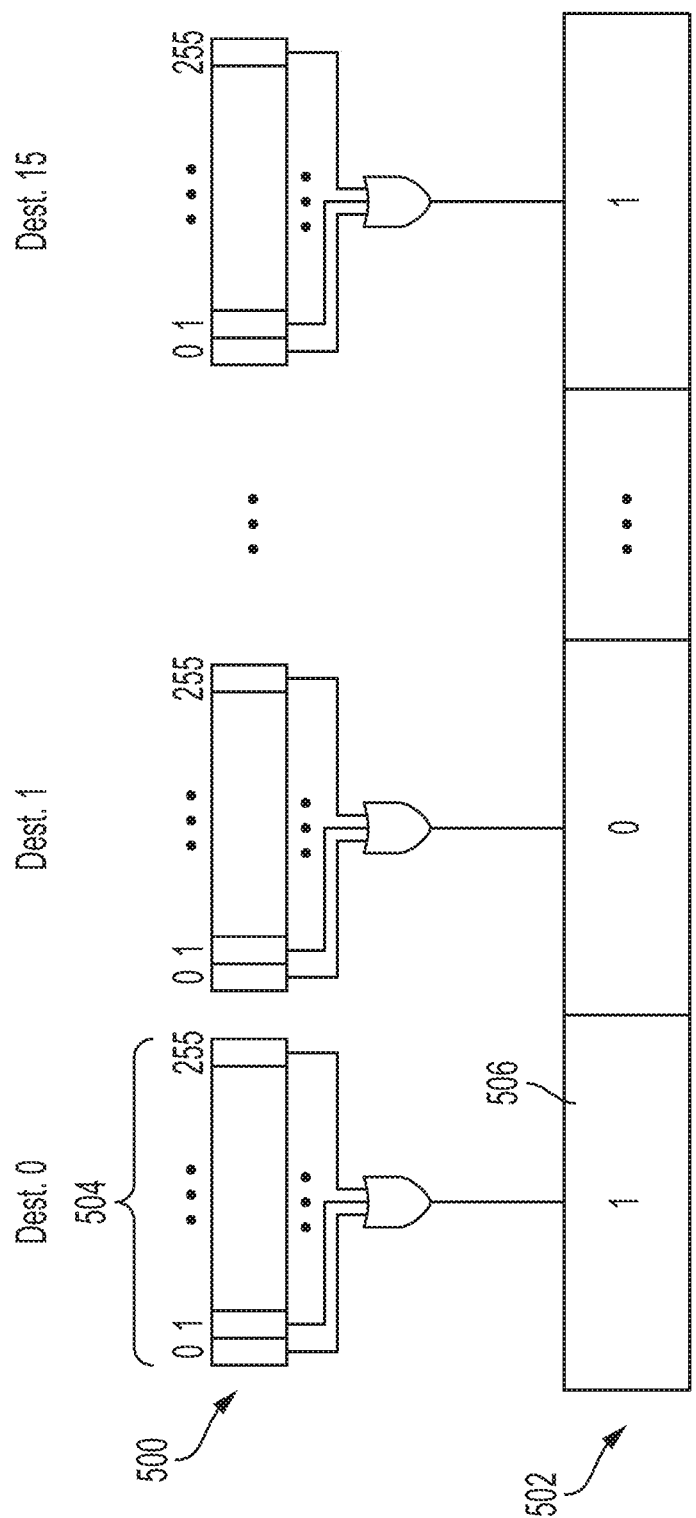
FIG. 5 is a conceptual layout diagram of exemplary hint maps that may be generated by a two-level arbitration system according to one embodiment.

FIG. 5 is a conceptual layout diagram of exemplary hint maps that may be generated by a two-level arbitration system according to one embodiment. The hint maps may include a first level hint map 500 and a second level hint map 502. The first level hint map 500 may include a plurality of bits, where each bit corresponds to a combination of two-dimensional parameters. For example, the two-dimensional parameter may identify a destination (e.g. destination 0-15 corresponding to one of the destinations 304 of FIG. 3) and a source (e.g. source 0-255 corresponding to one of the sources 302 of FIG. 3). Each bit of the first level hint map 500 may correspond to one of the queues 312 configured to enqueue data from the sources 302. The bits of the first level hint map 500 may be set to have a value of "1" if there is data in one of the queues 312, for the source and destination represented by the bit. Otherwise, the bit may have a value of "0."

The second level hint map 502 may include a plurality of bits, where each bit corresponds to a one-dimensional parameter. For example, the one-dimensional parameter may identify a destination (e.g. destination 0-15). The bits of the second level hint map 502 may be set to have a value of "1" if any of the sources (e.g. source 0-255) provides data addressed to the destination represented by the bit in the second level hint map. In one embodiment, the values of the bits of the second level hint map 502 are set by performing a logical OR operation of the bits in the first level hint map. The bits in the first level hint map 500 that may be used to perform the logical OR operation may be identified by the destination represented by the bit in the second level hint map 502 that is to be set. For example, a logical OR of the bits 504 in the first level hint map associated with destination "0" may be performed to set a bit 506 in the second level hint map associated with destination "0."

Figure 6:
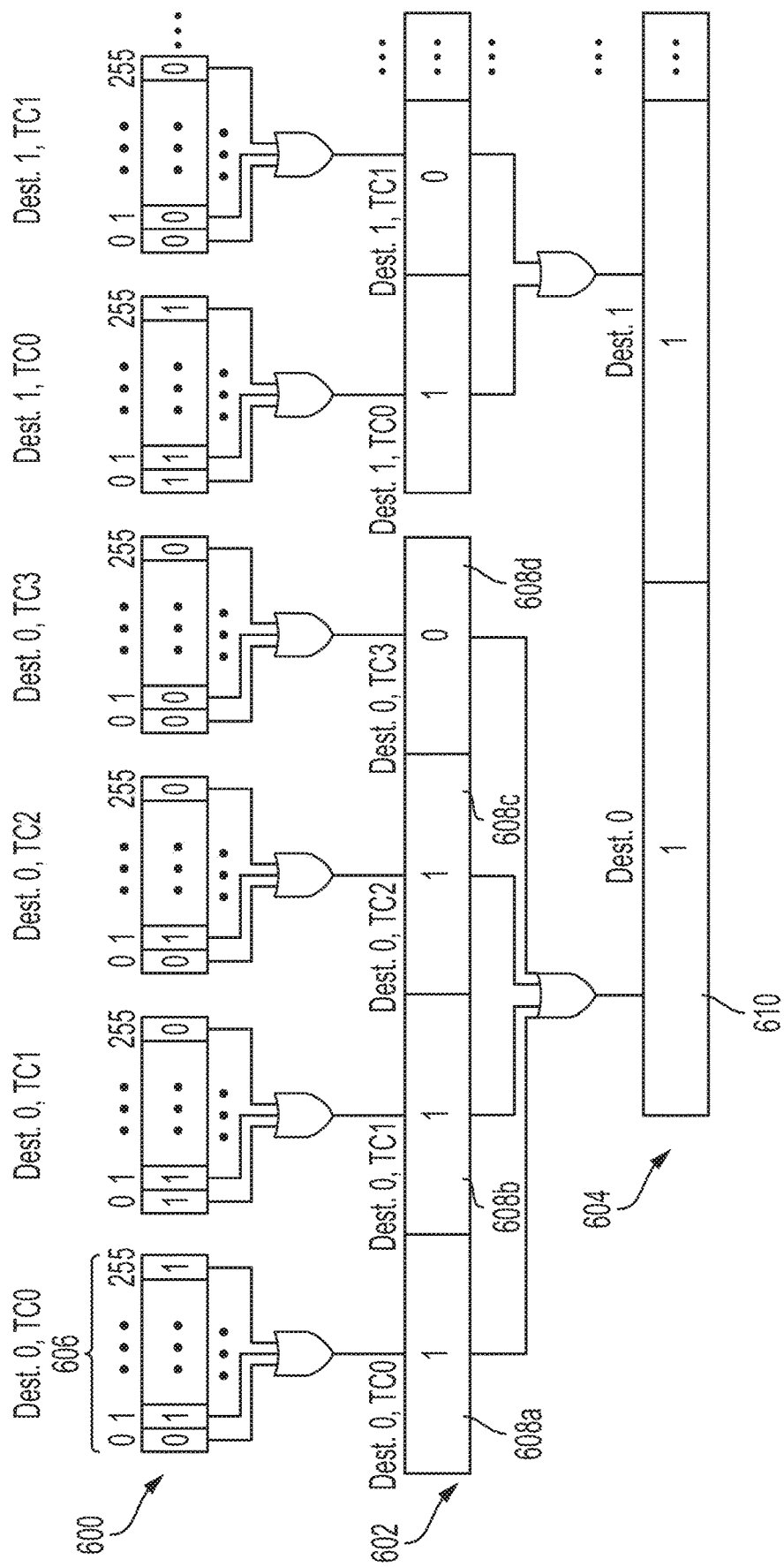
FIG. 6 is a conceptual layout diagram of exemplary hint maps that may be generated by a three-level arbitration system according to one embodiment.

FIG. 6 is a conceptual layout diagram of exemplary hint maps that may be generated by a three-level arbitration system (e.g. the arbitration system 400 of FIG. 4) according to one embodiment. The hint maps may include a first level hint map 600, a second level hint map 602, and a third level hint map 604. The first level hint map 600 may include a plurality of bits, where each bit corresponds a combination of three-dimensional parameters. For example, the three-dimensional parameter may identify a destination (e.g. destinations 0-15 corresponding to one of the destinations 404 of FIG. 4), a traffic class (e.g. traffic classes (TC) 0-3), and a source (e.g. source 0-255 corresponding to one of the sources 402 of FIG. 4). Each bit of the first level hint map 600 may correspond to one of the queues 410 of FIG. 4, enqueuing data from the sources 402. A bit of the first level hint map 600 may be set to have to a value of "1" if there is data in a corresponding queue 410 for the particular combination of source, traffic class, and destination, represented by the bit. Otherwise, the bit may have a value of "0."

The second level hint map 602 may include a plurality of bits, where each bit is corresponds to a combination of two-dimensional parameters. For example, the two-dimensional parameter may identify a destination (e.g. destination 0-16)), and a traffic class (e.g. TC 0-3). A bit of the second level hint map 602 may be set to have a value of "1" if any of the sources (e.g. sources 0-255) provides data associated with the particular combination of destination and traffic class represented by the bit in the second level hint map. In one embodiment, the values of the bits of the second level hint map 602 are set by performing a logical OR operation of the bits in the first level hint map 600. The bits in the first level hint map 600 that may be used to perform the logical OR operation may be identified by the destination and traffic class represented by the bit in the second level hint map 602 that is to be set. For example, a logical OR of the bits 606 in the first level hint map associated with destination "0" and TC "0" may be performed to set the bit 608a in the second level hint map associated with destination "0."

The third level hint map 604 may include a plurality of bits, where each bit corresponds to a one-dimensional parameter. For example, the one-dimensional parameter may identify a destination (e.g. destination 0-16). The bits of the third level hint map 604 may be set to have a value of "1" if any of the sources (e.g. sources 0-255) provides data addressed to the destination represented by the bit in the third level hint map. In one embodiment, the values of the bits of the third level hint map 604 are set by performing a logical OR operation of the bits in the second level hint map. The bits in the second level hint map 602 that may be used to perform the logical OR operation may be identified by the destination represented in the bit in the third level hint map 604 that is to be set. For example, a logical OR of bits 608a-608d in the second level hint map associated with destination "0" may be performed to set bit 610 in the third level hint map associated with destination "0."

Figure 7:
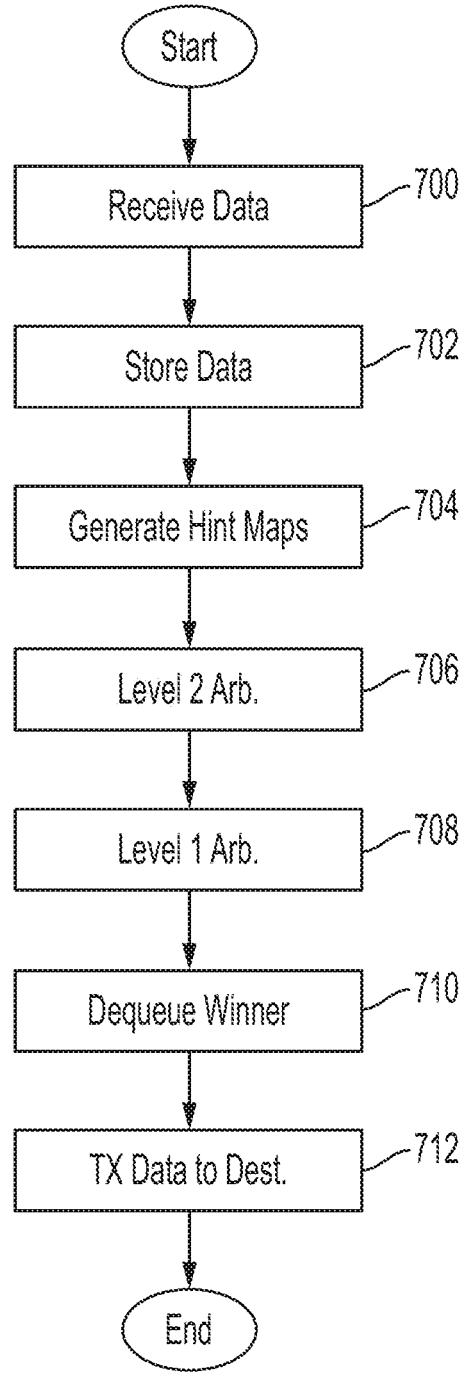
FIG. 7 is a flow diagram of a process for arbitrating access to a shared resource in a two-level arbitration system according to one embodiment.

FIG. 7 is a flow diagram of a process for arbitrating access to a shared resource in a two-level arbitration system according to one embodiment. The process starts, and at block 700, the distributor 308 (FIG. 3) receives data from one or more sources 302.

At block 702, the distributor 308 stores the data in a corresponding one of the queues 312. The queues 312 may be associated with a particular source and destination, and the data may be stored in one of the queues based on the source and destination of the received data.

At block 704, the hint map generator 314 generates first and second level hint maps based on the received data, and propagates the hints in the hint maps from a first arbitration level to a second. In this regard, the first level hint map may be a first data structure that is associated with a two-dimensional parameter that identifies the sources and destinations supported by the system. In one embodiment, the first data structure includes a plurality of bits. Each of the plurality of bits is associated with a queue, and further associated with the source and destination associated with the queue. A bit in the first data structure may be set based on the corresponding queue having data stored therein. In one embodiment, the first level hint map is propagated to the second arbitration level via a logical OR operation of the first level hint map similar to the operation described with respect to FIG. 5.

The second level hint map may be a second data structure that includes a plurality of bits. Each of the bits of the second data structure may be associated with a destination supported by the system. In one embodiment, the second level hint map may be generated by performing a logical OR operation of a subset of bits in the first data structure. If any of the subset of bits in the first data structure is set, the logical OR operation causes a corresponding bit in the second level hint map to be set.

At block 706, the reverse arbitration engine 316 may perform a level two arbitration based on the second level hint map. In this regard, the reverse arbitration engine 316 may select a destination of the various destinations that are set in the second level hint map, as a winning destination. The arbitration may be based on a scheduling algorithm such as, for example, round robin, weighted round robin, fixed priority, or the like.

At block 708, the reverse arbitration engine 316 may perform a level one arbitration based on the first level hint map. In this regard, the reverse arbitration engine may dynamically allocate logic (arbiter) for performing the level one arbitration. The arbiter may be a source arbiter that is allocated based on the winning destination from the level two arbitration. In this regard, the source arbiter may perform an arbitration of sources that are associated with the winning destination, to select a winning source. The arbitration may be based on a scheduling algorithm such as, for example, round robin, weighted round robin, fixed priority, or the like.

At block 710, the reverse arbitration engine 316 dequeues data in the queue associated with the winning source and destination.

At block 712, the dequeued data is transmitted to the shared resource 306 over the data communications link 320. The shared resource 306 may then transmit the data to the destination.

Figure 8:
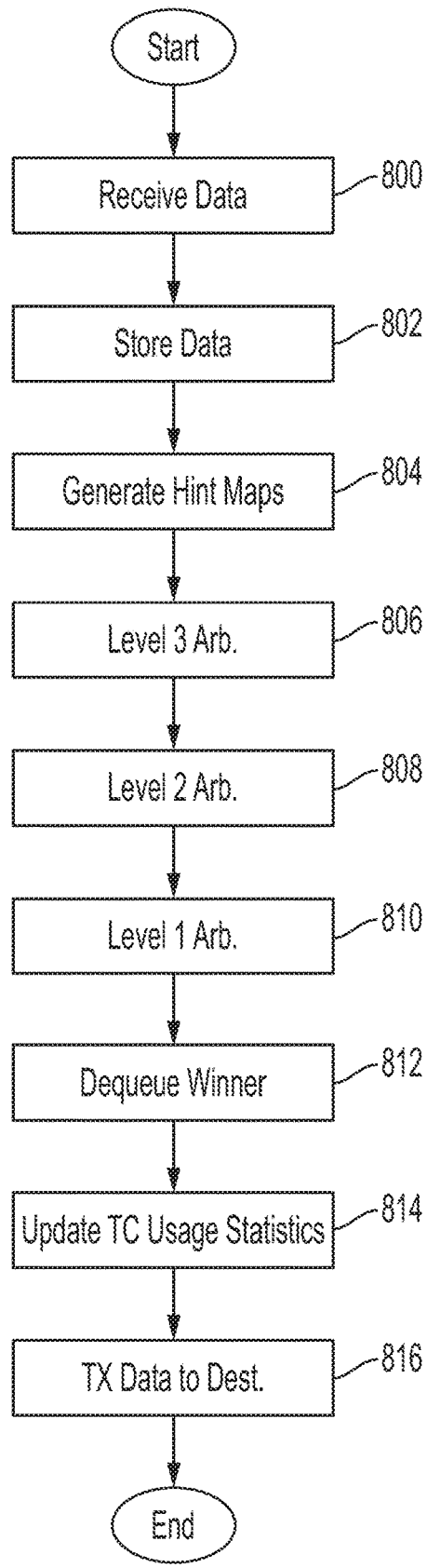
FIG. 8 is a flow diagram of a process for arbitrating access to a shared resource in a three-level arbitration system according to one embodiment.

FIG. 8 is a flow diagram of a process for arbitrating access to a shared resource in a three-level arbitration system according to one embodiment. The process starts, and at block 800, the distributor 308 (FIG. 3) receives data from one or more sources 302.

At block 802, the distributor 308 stores the data in a corresponding one of the queues 312. The queues 312 may be associated with a particular source, destination, and traffic class (priority level), and the data may be stored in one of the queues based on the source, destination, and traffic class of the received data.

At block 804, the hint map generator 314 generates first, second, and third level hint maps based on the received data, and propagates the hints in the hint maps from a first arbitration level to a second, and from the second arbitration level to a third. In this regard, the first level hint map may be a first data structure that is associated with a three-dimensional parameter that identifies the sources, destinations, and traffic classes supported by the system. In one embodiment, the first data structure includes a plurality of bits. Each of the plurality of bits may be associated with a queue, and further associated with the source, destination, and traffic class associated with the queue. A bit in the first data structure may be set based on the corresponding queue having data stored therein. In one embodiment, the first level hint map is propagated to a second level via a logical OR operation of the first level hint map similar to the operation described with respect to FIG. 6.

The second level hint map may be a second data structure that includes a plurality of bits. Each of the bits of the second data structure may be associated with a destination and traffic class supported by the system. In one embodiment, the second level hint map may be generated by performing a logical OR operation of a subset of bits in the first data structure. If any of the subset of bits in the first data structure is set, the logical OR operation causes a corresponding bit in the second level hint map to be set. In one embodiment, the second level hint map is propagated to the third arbitration level via a logical OR operation of the second level hint map similar to the operation described with respect to FIG. 5.

The third level hint map may be a third data structure that includes a plurality of bits. Each of the bits of the third data structure may be associated with a destination supported by the system. In one embodiment, the third level hint map may be generated by performing a logical OR operation of a subset of bits in the second data structure. If any of the subset of bits in the second data structure is set, the logical OR operation causes a corresponding bit in the third level hint map to be set.

At block 806, the reverse arbitration engine 316 may perform a level three arbitration based on the third level hint map. In this regard, the reverse arbitration engine 316 may select a destination of the various destinations that are set in the third level hint map, as a winning destination. The arbitration may be based on a scheduling algorithm such as, for example, round robin, weighted round robin, fixed priority, or the like.

At block 808, the reverse arbitration engine 316 may perform a level two arbitration based on the second level hint map. In this regard, the reverse arbitration engine may dynamically allocate logic (arbiter) for performing the level two arbitration. The arbiter may be traffic class arbiter that is allocated based on the winning destination from the level three arbitration. In this regard, the traffic class arbiter may perform an arbitration of traffic classes that are associated with the winning destination, to select a winning traffic class. The arbitration may be based on a scheduling algorithm that may consider, for example, usage data/statistics of the shared resource 306 by the various traffic classes.

At block 810, the reverse arbitration engine 316 may perform a level one arbitration based on the first level hint map. In this regard, the reverse arbitration engine may dynamically allocate logic (e.g., an arbiter) for performing the level one arbitration. The arbiter may be source arbiter that is allocated based on the winning traffic class from the level two arbitration. In this regard, the source arbiter may perform an arbitration of sources that are associated with the winning traffic class and winning destination, to select a winning source. The arbitration may be based on a scheduling algorithm such as, for example, round robin, weighted round robin, fixed priority, or the like.

At block 812, the reverse arbitration engine 316 dequeues data in the queue associated with the winning source, destination, and traffic class.

At block 814, the reverse arbitration engine may update the usage statistics for the winning traffic class, based on an estimate of an amount of time it may take to transmit the data to the destination.

At block 816, the dequeued data is transmitted to the shared resource 306 over the data communications link 320. The shared resource 306 may then transmit the data to the destination.

In some embodiments, the components of the arbitration system 300, 400 discussed above, are implemented in one or more processing circuits. The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of an arbitration system and method have been specifically described and illustrated herein, many modifications and variations will be apparent to those skilled in the art. Accordingly, it is to be understood that an arbitration system and method constructed according to principles of this disclosure may be embodied other than as specifically described herein. The disclosure is also defined in the following claims, and equivalents thereof.

What is claimed is:

1. A method for arbitrating access of a shared resource, the method comprising:
   receiving data from a plurality of sources;
   storing the data in a plurality of queues, wherein a first queue of the plurality of queues is dedicated to a first source and a first destination, and a second queue of the plurality of queues is dedicated to a second source and a second destination;
   generating a first data structure based on the data stored in the plurality of queues, the first data structure being associated with at least two dimensions, wherein the at least two dimensions include a first dimension associated with the plurality of sources and a second dimension associated with a plurality of destinations;

generating a second data structure based on the first data structure, the second data structure being associated with at least one dimension, wherein the at least one dimension includes the second dimension;

performing a first arbitration based on the second data structure, the first arbitration for selecting the first destination from the plurality of destinations;

in response to the selecting of the first destination based on the first arbitration, performing a second arbitration based on the first data structure and further based on the selecting of the first destination, the second arbitration for selecting the first source from the plurality of sources;

identifying the first queue in response to the selecting of the first destination based on the first arbitration and the selecting of the first source based on the second arbitration;

retrieving data stored in the first queue in response to the identifying of the first queue; and providing the retrieved data to the shared resource.

2. The method of claim 1, wherein the first data structure includes a plurality of first bits, wherein a first bit of the plurality of first bits is associated with the first source and the first destination, wherein the first bit is set based on the data being stored in the first queue.

3. The method of claim 2, wherein the second data structure includes a plurality of second bits, wherein a second bit of the plurality of second bits is associated with the first destination, and wherein the generating of the second data structure includes performing a logical OR operation based on a subset of bits of the first data structure having the first destination as the second dimension.

4. The method of claim 1 further comprising: dynamically allocating logic for performing the second arbitration based on the selecting of the first destination.

5. The method of claim 1, wherein the shared resource is a data transmissions link.

6. A method for arbitrating access of a shared resource, the method comprising:

receiving data from a plurality of sources;

storing the data in a plurality of queues, wherein a first queue of the plurality of queues is dedicated to a first source, a first attribute, and a first destination, and a second queue of the plurality of queues is dedicated to a second source, a second attribute, and a second destination;

generating a first data structure based on the data stored in the plurality of queues, the first data structure being associated with at least three dimensions, wherein the at least three dimensions include a first dimension associated with the plurality of sources, a second dimension associated with a plurality of attributes, and a third dimension associated with a plurality of destinations;

generating a second data structure based on the first data structure, the second data structure being associated with at least two dimensions, wherein the at least two dimensions include the second dimension associated with the plurality of attributes, and the third dimension associated with the plurality of destinations;

generating a third data structure based on the second data structure, the third data structure being associated with at least one dimension, wherein the at least one dimension includes the third dimension;

performing a first arbitration based on the third data structure, the first arbitration for selecting the first destination from the plurality of destinations;

in response to the selecting of the first destination based on the first arbitration, performing a second arbitration based on the second data structure and further based on the selecting of the first destination, the second arbitration for selecting the first attribute from the plurality of attributes;

in response to the selecting of the first attribute, performing a third arbitration based on the first data structure, the selecting of the first attribute, and the selecting of the first destination, the third arbitration for selecting the first source from the plurality of sources;

identifying the first queue in response to the selecting of the first destination based on the first arbitration, the selecting the first attribute based on the second arbitration, and the selecting the first source based on the third arbitration;

retrieving data stored in the first queue in response to the identifying of the first queue; and providing the retrieved data to the shared resource.

7. The method of claim 6, wherein the first attribute is a priority level of a plurality of priority levels.

8. The method of claim 6, wherein the first data structure includes a plurality of first bits, wherein a first bit of the plurality of first bits is associated with the first source, the first attribute, and the first destination, wherein the first bit is set based on the data being stored in the first queue.

9. The method of claim 8, wherein the second data structure includes a plurality of second bits, wherein a second bit of the plurality of second bits is associated with the first attribute and the first destination, wherein the generating of the second data structure includes performing a logical OR operation based on subset of bits of the first data structure having the first attribute and the first destination as respectively the second dimension and the third dimension.

10. The method of claim 6, wherein the third data structure includes a plurality of third bits, wherein a third bit of the plurality of third bits is associated with the first destination, wherein the generating of the third data structure includes performing a logical OR operation based on a subset of bits of the second data structure having the first destination as the third dimension.

11. The method of claim 6 further comprising:

dynamically allocating logic for performing the second arbitration based on the first destination; and dynamically allocating logic for performing the third arbitration based on the first attribute and the first destination.

12. The method of claim 6, wherein the shared resource is a data transmissions link.

13. A system for arbitrating access of a shared resource, the system comprising:

a memory for storing a plurality of queues, the plurality of queues storing data from a plurality of sources, wherein a first queue of the plurality of queues is dedicated to a first source and a first destination, and a second queue of the plurality of queues is dedicated to a second source and a second destination; and a processing circuit coupled to the memory, the processing circuit having logic for:

generating a first data structure based on the data stored in the plurality of queues, the first data structure being associated with at least two dimensions, wherein the at least two dimensions include a first dimension associated with the plurality of sources and a second dimension associated with a plurality of destinations;

generating a second data structure based on the first data structure, the second data structure being associated with at least one dimension, wherein the at least one dimension includes the second dimension;

performing a first arbitration based on the second data structure, the first arbitration for selecting the first destination from the plurality of destinations;

in response to the selecting of the first destination based on the first arbitration, performing a second arbitration based on the first data structure and further based on the selecting of the first destination, the second arbitration for selecting the first source from the plurality of sources;

identifying the first queue in response to the selecting of the first destination based on the first arbitration and the selecting of the first source based on the second arbitration;

retrieving data stored in the first queue in response to the identifying of the first queue; and providing the retrieved data to the shared resource.

14. The system of claim 13, wherein the first data structure includes a plurality of first bits, wherein a first bit of the plurality of first bits is associated with the first source and the first destination, wherein the first bit is set based on the data being stored in the first queue.

15. The system of claim 14, wherein the second data structure includes a plurality of second bits, wherein a second bit of the plurality of second bits is associated with the first destination, and wherein the generating of the second data structure includes performing a logical OR operation based on a subset of bits of the first data structure having the first destination as the second dimension.

16. The system of claim 13, wherein the processing circuit further includes logic for: dynamically allocating logic for performing the second arbitration based on the selecting of the first destination.

17. The system of claim 13, wherein the shared resource is a data transmissions link.

\* \* \* \* \*

UNITED STATES PATENT AND TRADEMARK OFFICE
CERTIFICATE OF CORRECTION

| | |
|---|---|
| PATENT NO. | : 11,720,404 B2 |
| APPLICATION NO. | : 17/076681 |
| DATED | : August 8, 2023 |
| INVENTOR(S) | : Chun-chu Chen-jhy Wu |

It is certified that error appears in the above-identified patent and that said Letters Patent is hereby corrected as shown below:

In the Claims

Column 18, Line 41, Claim 10        Delete "claim 6," and
Insert -- claim 9, --

Signed and Sealed this
Third Day of October, 2023

Katherine Kelly Vidal
*Director of the United States Patent and Trademark Office*